(No Model.) 2 Sheets—Sheet 1.
D. S. REGAN.
POWER TRANSMITTER.
No. 546,249. Patented Sept. 10, 1895.
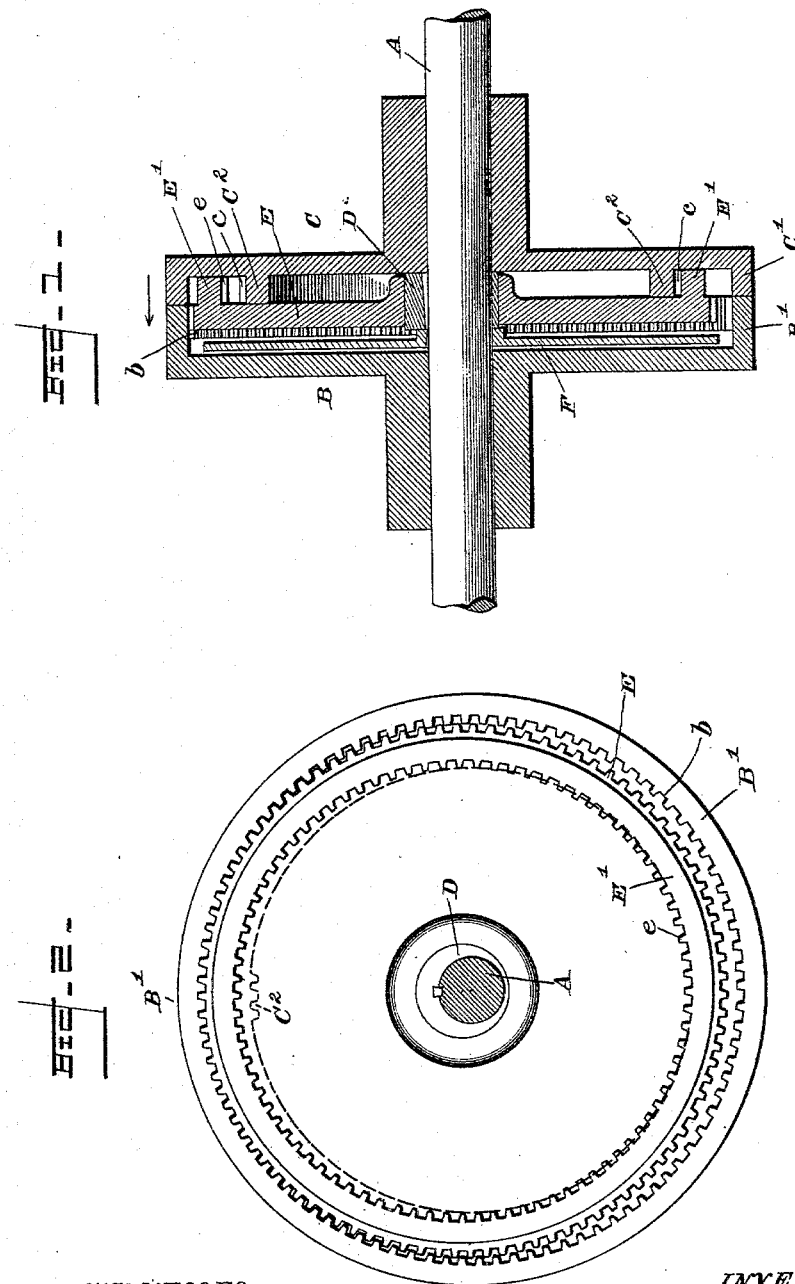
WITNESSES
Edw. S. Duvall Jr.
Wm. L. Boyden
INVENTOR
Daniel S. Regan
per Fred E. Tacker,
Attorney (No Model.) 2 Sheets—Sheet 2.
D. S. REGAN.
POWER TRANSMITTER.
No. 546,249. Patented Sept. 10, 1895.
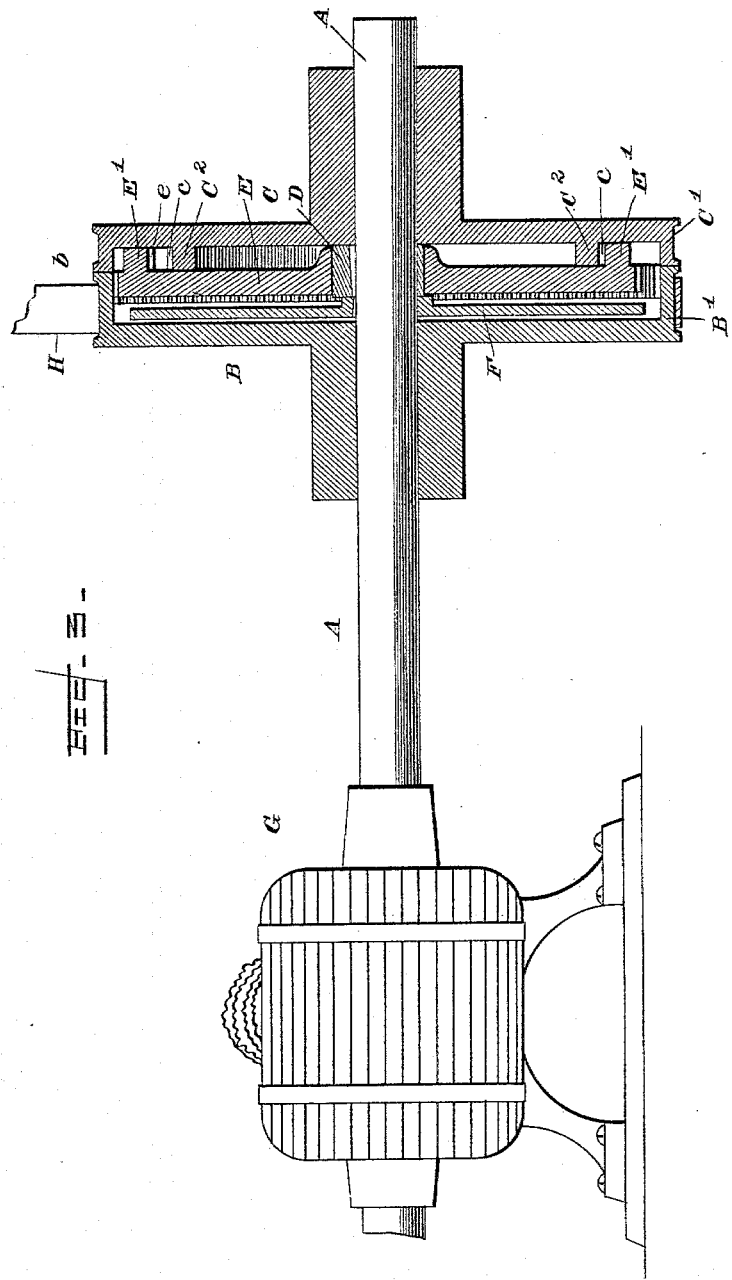
WITNESSES
Edw. S. Duvall, Jr.
Wm. L. Boyden
INVENTOR
Daniel S. Regan
per Fred E. Baker,
Attorney

UNITED STATES PATENT OFFICE.

DANIEL S. REGAN, OF SAN FRANCISCO, CALIFORNIA, ASSIGNOR OF TWO-THIRDS TO BELLE W. BIRRELL, OF SAME PLACE, AND MICHAEL J. EGAN, OF BROOKLYN, NEW YORK.

POWER-TRANSMITTER.

SPECIFICATION forming part of Letters Patent No. 546,249, dated September 10, 1895.

Application filed June 7, 1894. Serial No. 513,739. (No model.)

*To all whom it may concern:*

Be it known that I, DANIEL S. REGAN, a citizen of the United States, residing at San Francisco, in the county of San Francisco and State of California, have invented certain new and useful Improvements in Power-Transmitters; and I do hereby declare the following to be a full, clear, and exact description of the invention, such as will enable others skilled in the art to which it appertains to make and use the same.

My present invention relates to an improved mechanism for transmitting the power developed in the armature-shaft of electric motors and other high speed prime movers; and the invention has for its object the adaptation of a new and improved form of reduction-gearing for use in this connection. To accomplish this object I employ certain mechanical elements which will cause a minimum variation of speed between the first and last elements of the mechanism with a minimum throw of the eccentric, such an operation being very essential, as the moving gears must be balanced concentrically with the shaft in a line central with the eccentric and directly opposite its highest point; and the invention therefore consists in the construction, arrangement, and combination of parts, substantially as will be hereinafter described and claimed.

In the annexed drawings, illustrating my invention, Figure 1 is a transverse sectional view of my improved power-transmitting device. Fig. 2 is a face view of the gearing, viewed in the direction of the arrow shown in Fig. 1, and with one of the disks removed. Fig. 3 is a view similar to Fig. 1, showing the apparatus arranged in connection with the armature-shaft of an electric motor.

Like letters of reference denote like parts in all the different figures.

A denotes a shaft, which is adapted for rotation by any suitable kind of motor. In the present example it is shown in Fig. 3 as the armature-shaft of an electric motor, but it may be any other high-speed shaft. G denotes the electric motor. On this shaft A are two disks B and C of any desired size and form. These disks are provided at their outer peripheries with circular flanges B' and C', which preferably come into contact with each other, as shown, said flanges constituting together a closed compartment, both of which flanges are supported revolubly upon the shaft A, from which as a prime mover motion may be imparted to either one of the disks, the other being held stationary by any suitable means. The flange B' of the disk B is internally toothed at $b$ to provide an internal gear-wheel, and the disk C is provided at a suitable point from the flange C' with a concentric flange $C^2$, which is externally toothed to provide a gear-wheel $c$.

Keyed on the shaft A, between the disks B and C, is an eccentric D, having the minimum size possible to achieve a given result, and loosely supported on this eccentric is a combined external and internal gear-wheel, the outer edge of which is a spur gear-wheel E, whose periphery is concentric with the periphery of the eccentric and whose diameter is such that a portion of its teeth will be in mesh with the teeth $b$ of the internally-geared disk B, its number of teeth being less than that of the gear $b$. I preferably provide the external spur-gear E with ninety-two teeth and the internal gear $b$ with ninety-six teeth. These numbers are given, however, merely as examples, and I do not wish to be restricted to them. Thus, when the shaft A rotates the gear-wheel E will have a compound movement, since it will not only rotate on its own axis, but it will also revolve around the axis of shaft A, with its teeth entering, consecutively, the teeth $b$ of the internal gear. The wheel is provided near its toothed periphery with a flange E', which is internally toothed at $e$, said teeth being in mesh with the gear-wheel $c$, which, as we have seen, is integral with the disk C. A similar relationship exists between the internal gear $e$ and the external spur-gear $c$ as obtains between the gear-wheel E and the internal gear $b$, in that they are eccentric to each other, and the internal gear $e$ has a compound movement, the other gear $c$ having in this instance the smaller diameter and the less number of teeth. For example, the gear $e$ may have sixty-four teeth and the gear $c$ sixty teeth; but of course I am not restricted to these numbers. The gear-wheel E has a less number of teeth than the internal gear b, and consequently will revolve more rapidly than the disk B, the speed of the latter being reduced proportionally to the difference in size of the two wheels in accordance with the well-known principle of reduction-gearing. Similarly the disk C will have a faster rate of movement than the gear-wheel E, since its gear-wheel c is of less diameter and of a less number of teeth than the internal gear e with which it is in mesh. Therefore if the disk B be held stationary by suitable devices—as, for instance, by clamp H (shown in Fig. 3)—the movement of the disk C will be diminished below that of the rapidly-moving actuating-shaft A, and vice versa. If the disk C be held stationary the revolution of the disk B will be retarded below that of the shaft A, and the amount of the reduction in each case will be dependent upon the relative size of the different gears, and hence by regulating their size, proportions, and arrangement, any desired reduction can be had. The direction of motion of the disk B when the disk C is held stationary is opposite to that of the disk C when the disk B is held stationary. It will thus be seen that the principal gear-wheel in my combination is the combined external and internal gear-wheel, which is one having an external gear and also an internal gear and one which is supported loosely upon an eccentric, and that its external gear meshes into the teeth of an internal gear-wheel of larger diameter, while its internal gear meshes into the teeth of an external gear of less diameter. It is an absolute novelty in reduction-gearing having the same purpose in view as that sought to be achieved by my combination to provide an internal gear-wheel supported loosely upon and driven by an eccentric with which it is concentric and engaging a spur-wheel of less diameter. This conspicuous feature, which characterizes the combined external and internal gear-wheel, is of extreme importance in my combination, for thereby I am enabled to obtain with a small eccentric—one having a slight throw—a reduction equivalent to that ordinarily gained in ordinary reduction-gearing with a much larger eccentric. I lay particular stress upon this improved result and the marked advantages accruing therefrom. The difference in diameter between the external gear E and the internal gear e will vary as much as desired in different devices, according to the nature of the result to be attained in the use of the same.

On the drive-shaft A, I place a balance or balance-wheel F, which is securely fixed on the shaft. It may be located within the disks B and C or at any other point on the shaft, the exact point being a matter to be ascertained in practice. This balance is of great importance in making the movement of the gearing steady and uniform and avoiding irregularities and jerks which strain and damage the machinery, and it is indispensable when the gearing is employed with high-speed prime-movers, such as electric motors. Heretofore it has not been practical to employ gearing of this kind with rapidly moving shafts because of the shaking and jarring of the parts due to the high speed; but by balancing the mechanism as I have done the use of the gearing becomes practicable, and it may be utilized in many ways and for many purposes.

Various changes in the precise construction, arrangement, and relative proportion, &c., of the different parts may be made without departing from the invention.

Having thus described my invention, what I claim as new, and desire to secure by Letters Patent, is—

1. The combination with a driving shaft and an eccentric fixed thereon and revolving therewith, of a combined external and internal gear wheel revolving loosely upon and driven by the eccentric, and the internal and external gear wheels respectively engaging said external and internal gear.

2. The combination with an electric motor and its driving shaft, of an eccentric fixed thereon and revolving therewith, a combined external and internal gear wheel revolving loosely upon and driven by the eccentric, and internal and external gear wheels respectively engaging said external and internal gear, substantially as described.

3. The combination with a driving shaft and an eccentric fixed thereon and revolving therewith, of a combined external and internal gear wheel revolving loosely upon and driven by the eccentric, the internal and external gear wheels respectively engaging said external and internal gear and a balance on the shaft for counterbalancing the eccentric and the gearing supported thereon, substantially as described.

4. The combination of a driving shaft, an eccentric fixed thereon and revolving therewith, a combined external and internal gear wheel revolving loosely upon and driven by the eccentric, an internal gear on the shaft engaging the aforesaid external gear and having a greater diameter and a greater number of teeth, and an external gear likewise on the shaft and engaging the internal gear of the combined gear wheel and having a less number of teeth than the internal gear, together with a balance on the shaft for counterbalancing the eccentric and the gearing supported on the eccentric, substantially as described.

In testimony whereof I affix my signature in presence of two witnesses.

DANIEL S. REGAN.

Witnesses:
CHAS. W. BLACKWOOD,
GEO. B. BINELL.